United States Patent
Nair et al.

(10) Patent No.: US 11,709,112 B2
(45) Date of Patent: Jul. 25, 2023

(54) SYSTEM, APPARATUS AND METHOD OF DETERMINING REMAINING LIFE OF A BEARING

(71) Applicant: SIEMENS AKTIENGESELLSCHAFT, Munich (DE)

(72) Inventors: P. V. Sudev Nair, Karnataka (IN); Krishna Phanindra Sri Paravastu, Secunderabad (IN)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/297,245

(22) PCT Filed: Nov. 29, 2019

(86) PCT No.: PCT/EP2019/083109
§ 371 (c)(1),
(2) Date: May 26, 2021

(87) PCT Pub. No.: WO2020/109561
PCT Pub. Date: Jun. 4, 2020

(65) Prior Publication Data
US 2022/0050015 A1   Feb. 17, 2022

(30) Foreign Application Priority Data
Nov. 30, 2018 (EP) .................................... 18209549

(51) Int. Cl.
*G01M 13/04* (2019.01)
*G05B 23/02* (2006.01)

(52) U.S. Cl.
CPC ......... *G01M 13/04* (2013.01); *G05B 23/0243* (2013.01); *G05B 23/0283* (2013.01)

(58) Field of Classification Search
CPC ............... G01M 13/04; G05B 23/0243; G05B 23/0283
(Continued)

(56) References Cited

U.S. PATENT DOCUMENTS 5,661,353 A * 8/1997 Erdman ............. H02K 11/0141
 310/85
5,852,793 A   12/1998 Board et al.
(Continued)

FOREIGN PATENT DOCUMENTS

| CN | 2804834 Y | 8/2006 |
| DE | 102010002294 A1 | 8/2011 |
| WO | WO-2015043619 A1 * | 4/2015 ............ G01M 13/04 |

OTHER PUBLICATIONS

English translation for WO-2015043619 (Year: 2015).*
(Continued)

*Primary Examiner* — Lee E Rodak
*Assistant Examiner* — Byung Ro Lee
(74) *Attorney, Agent, or Firm* — Lempia Summerfield Katz LLC

(57) ABSTRACT

A system, apparatus and method of determining remaining life of a bearing is disclosed. The method includes generating a bearing model of the bearing. The bearing model is based on one of condition data associated with operation of the bearing, historical condition data of the bearing, bearing specification and technical specification of a technical system including the bearing. The method further includes predicting a defect in the bearing based on the bearing model and predicting the remaining life of the bearing based on the predicted defect.

17 Claims, 6 Drawing Sheets

(58) Field of Classification Search
USPC .......................................................... 702/34
See application file for complete search history.

(56) References Cited

U.S. PATENT DOCUMENTS

| | | | | |
|---|---|---|---|---|
| 7,501,784 | B2 * | 3/2009 | Schrepfer | H02K 11/20 318/632 |
| 2011/0040495 | A1 | 2/2011 | El-refaie et al. | |
| 2011/0125475 | A1 | 5/2011 | Lugt | |
| 2012/0143565 | A1 | 6/2012 | Graham et al. | |
| 2012/0330580 | A1 * | 12/2012 | Fruh | G01M 13/04 702/57 |
| 2013/0311113 | A1 * | 11/2013 | Basu | G01R 31/343 702/58 |
| 2014/0324236 | A1 | 10/2014 | Bankeström | |
| 2017/0108406 | A1 * | 4/2017 | Thomson | G01M 13/045 |
| 2017/0236065 | A1 * | 8/2017 | Kirschnick | G06Q 10/06 702/181 |
| 2018/0180515 | A1 | 6/2018 | Gandhi et al. | |

OTHER PUBLICATIONS

International Preliminary Report on Patentability for International Patent Application PCT/EP2019/083109 dated Nov. 19, 2020.
International Search Report and the Written Opinion for International Patent Application PCT/EP2019/083109 dated Feb. 24, 2020.

* cited by examiner

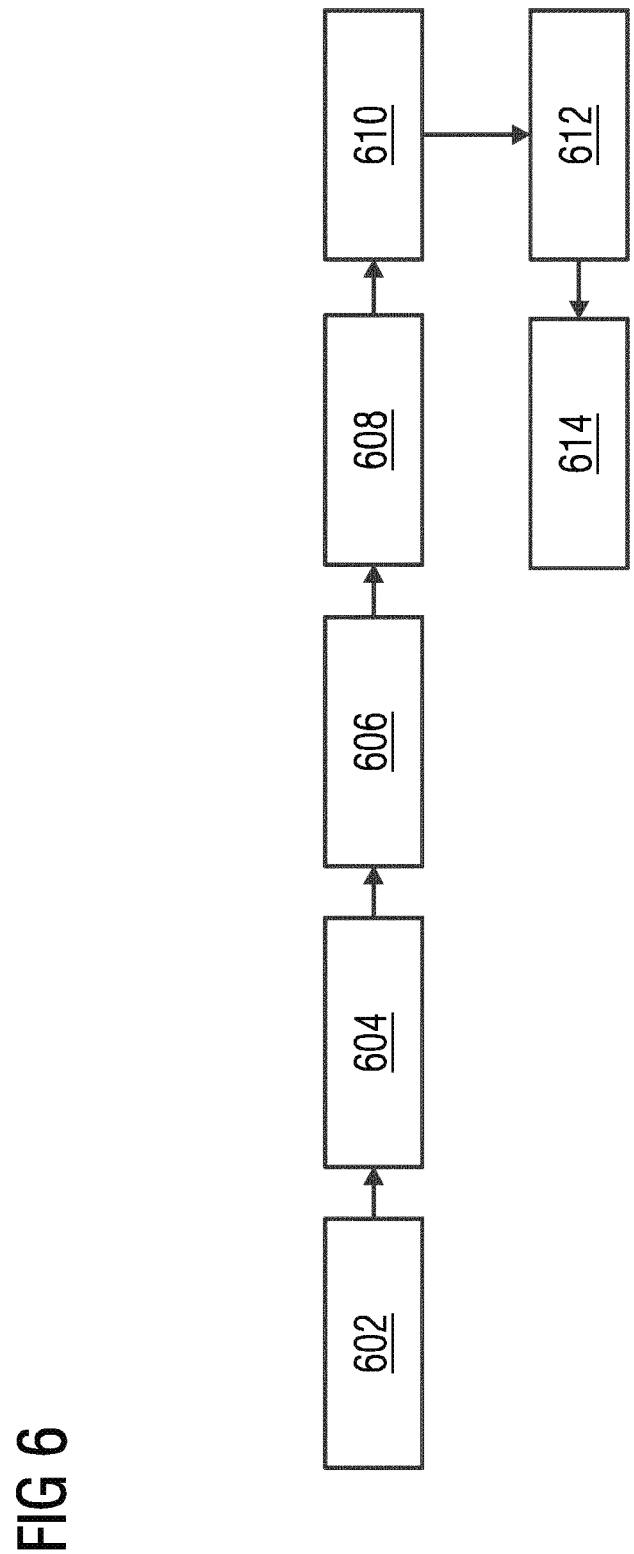

SYSTEM, APPARATUS AND METHOD OF DETERMINING REMAINING LIFE OF A BEARING

CROSS REFERENCE TO RELATED APPLICATIONS

This present patent document is a § 371 nationalization of PCT Application Serial Number PCT/EP2019/083109 filed on Nov. 29, 2019, designating the United States, which is hereby incorporated in its entirety by reference. This patent document also claims the benefit of EP 18209549.7 filed on Nov. 30, 2018 which is hereby incorporated in its entirety by reference.

FIELD

Embodiments relate to determining remaining life of a bearing in a technical system.

BACKGROUND

Bearings may be subject to currents that are caused by drives that are used to drive low voltage and medium voltage technical systems. The currents in the bearing may lead to several kinds of damage such as current based erosion. The current erosion may further lead to fatigue crack propagation in bearing raceways. The damage reduces life of the bearings. The reduced life of the bearings may lead to failure of the technical systems that include the bearings.

To overcome damage of the bearings, methods to protect the bearings have been used. The methods include insulation of the bearing, usage of shaft grounding brush, conductive greases etc. Such methods may be expensive and in-effective in estimating remaining life of the bearings. Such prior art methods are disclosed for example in the following documents describing the technological background art.

DE 10 2010 002294 A1 discloses that a process calculator uses a simulation model which generates result values and bearing state values. The simulation model may give an evaluation regarding the use of the bearing and about an estimation of the remaining life of the bearing.

US 2018/180515 A1 mentions the use and calculation of an empirical model for bearing evaluation.

U.S. Pat. No. 5,852,793 A discloses a good bearing and its vibration, acoustics and spawn frequencies.

US 2011/040495 A1 discloses that the condition of a bearing is only considered in order to predict a failure of the bearing. Acquired data and failure data acquired in test breaks are used to predict the failure of the bearing.

In light of the above, there exists a need to determine remaining life of a bearing.

BRIEF SUMMARY AND DESCRIPTION

The scope of the present invention is defined solely by the appended claims and is not affected to any degree by the statements within this summary. The present embodiments may obviate one or more of the drawbacks or limitations in the related art.

Embodiments provide a system, apparatus and method for determine remaining life of a bearing in a technical system.

Embodiments provide a method to determine remaining life of the bearing in the technical system. The method includes generating a bearing model of the bearing. As used herein, the bearing model is digital representation of the bearing based on condition data associated with operation of the bearing, historical condition data of the bearing, bearing specification and technical specification of the technical system. For example, the bearing model represents operating conditions of the bearing in real-time and the historical operating conditions of the bearing.

The condition data of the bearing is received from different sources (e.g., sensors, scanners, user devices, etc.). The sensors measure operating parameters associated with the technical system. The sensors may include vibration sensors, current and voltage sensors, etc. For example, measurement of shaft voltage in a motor is mapped to an operation parameter of the bearing. The term "operation parameter" refers to one or more characteristics of the bearing. Accordingly, the condition data is a measure of the operating parameters associated with the operation of the bearing. For example, the condition data includes values of vibration, temperature, current, magnetic flux, velocity, power of the motor including the bearing.

The method may include generating a voltage model of the bearing based on the condition data. The condition data includes bearing load and bearing speed. In an embodiment, the bearing load and bearing speed is mapped with respect to breakdown voltage of the bearing and a common mode voltage of the bearing. In another embodiment, the bearing load and bearing speed are mapped in a graphical programming environment. The advantage of mapping the bearing load and bearing speed provides modelling, simulation and analysis of multidomain dynamical systems.

The method may include converting an alternating voltage input to the technical system to a Pulse Width Modulated (PWM) output. For example, the technical system is a three phase Alternating Current (AC) induction motor that are driven by Variable Frequency Drives (VFD). The alternating voltage input to the AC induction motor is converted to PWM output.

Further, the method may include determining whether the PWM output is within a predetermined voltage threshold. Considering the example of the AC induction motor, sum of three phases of PWM output must ideally be zero. According, it is determined whether the PWM output is within zero or in a tolerance range of zero.

Furthermore, the method may include determining the breakdown voltage and the common mode voltage based on deviation from the predetermined voltage threshold. In case of the AC induction motor, if the sum of the three phases of PWM output does not add to zero. The deviation from zero is used to determine the common mode voltage.

The method may include generating a current model of the bearing based on the voltage model, the bearing specification and the technical specification. The current model maps the breakdown voltage and the common mode voltage to discharge current. For example, the bearing specification includes bearing dimensions, bearing size, bearing lubrication, lubrication thickness, bearing operating temperature, bearing interfaces, etc. The technical specification includes technical system type, technical system load, technical system speed, technical system orientation, etc.

In an embodiment, the method may include generating an equivalent circuit with the bearing specification and the technical specification. For example, the equivalent circuit of the AC induction motor is represented in relation to the capacitances, inductances and resistances of winding, frame, etc of the AC induction motor. The method may further include, applying the common mode voltage as input to the equivalent circuit. The equivalent circuit outputs shaft-ground voltage in response to the common mode voltage. The current model is generated based on the shaft ground voltage. As used herein, the current model includes values of the discharge current in time series with respect to the shaft ground voltage and the common mode voltage. In addition, the method may include mapping the lubricant thickness as a function of the technical system load and the technical system speed.

The method may include generating a spark heat based on the current model for at least one spark. Further, determining a spark diameter based on the current model. The method may further include determining a thermal model based on the current model. As used herein, the thermal model is a representation of the spark heat and the spark diameter. The thermal model maps the spark heat and the spark diameter to the discharge current. In an embodiment, the thermal model includes distribution of the spark heat and the spark diameter in time series.

The method may include determining radius and peaks of the discharge current in the current model. The spark heat for a bearing surface of the bearing is determined based on the radius and peaks of discharge current. In an embodiment, the method may include generating the thermal model by mapping the spark heat and the spark diameter with the discharge current. In another embodiment, the thermal model is generated by mapping the spark heat and the spark diameter to surface points on the bearing surface.

The method includes predicting a defect in the bearing based on the bearing model. The defect in the bearing may include erosion of bearing raceway due to the discharge current. The method is advantageous as the defect is determined based on a combination of condition data associated with operation of the bearing, historical condition data of the bearing, bearing specification and technical specification of the technical system.

The method may include comparing the condition data with defect profiles. As used herein, the term "defect profile" refers to anomalous data represented as a function of operation environment, operation profile and/or load profile associated with the bearing and/or technical system.

The defect profiles are generated based on the bearing specification and the technical specification. The defect in the bearing may also be predicted based on the comparison between the condition data and with predetermined defect profiles. In an embodiment, the method may include generating a defect model including the defect profiles that are generated from a bearing fleet and a fleet of the technical system. The method is advantageous as the defect profiles are used to determine erosion pattern on the bearing surface. The erosion pattern is indicative of the defect such as defect type, defect location, defect severity, etc.

In an embodiment, the method may include determining a bearing current in real-time. The bearing current is input to the thermal model to determine the one that does real time current measurement. This current may be used as an input to the thermal model to generate the erosion pattern.

In an embodiment, the method may include determining location of the at least one spark in the bearing. For example, the location of spark in the bearing raceway is determined. Further, the thermal model is generated for multiple thermal loads of the bearing. The thermal model is analysed to identify vaporization temperature. For example, the vaporization temperature of the bearing lubrication is determined. The vaporization temperature is used to determine the erosion pattern.

The method includes predicting remaining life of the bearing based on the predicted defect. In an embodiment, the remaining life of the bearing is predicted based on the defect profiles and/or the erosion pattern. For example, the defect profiles are associated with predetermined life profiles. The predetermined life profiles are learned from the historical condition data of the bearing or the fleet of bearings. Example learning techniques include supervised and/or unsupervised learning techniques such as reinforced learning, deep reinforced learning, k-means clustering, etc.

The method may include predicting a defect propagation based on location of the defect and type of the defect. Further, the remaining life of the bearing based on the predicted defect propagation. As used herein, the remaining life refers to life of the bearing with and without the detected defect. The remaining life includes remaining useful life (RUL), down-time, maintenance time, etc.

The method may include estimating an expended life of the bearing based on the bearing model. The remaining life is estimated based on the expended life and first detection anomaly in the condition data. The method may include rendering the expended life, the remaining life and a usage profile of the bearing. The method may further include rendering a degradation view of the bearing and/or the technical system based on the bearing model. The degradation view depicts a real-time degradation and a predicted degradation of the bearing or the technical system. The real-time degradation is determined based on vibration data from the condition data. The method advantageously depicts the impact of the defect in the bearing in terms of degradation of the technical system.

Embodiments provide an apparatus for determining remaining life of a bearing in a technical system. The apparatus includes one or more processing units and a memory unit communicative coupled to the one or more processing units. The memory unit includes a bearing module stored in the form of machine-readable instructions executable by the one or more processing units. The bearing module is configured to perform one or more method steps described above. The execution of the bearing module may also be performed using co-processors such as Graphical Processing Unit (GPU), Field Programmable Gate Array (FPGA) or Neural Processing/Compute Engines.

According to an embodiment, the apparatus may be an edge computing device. As used herein "edge computing" refers to computing environment that is capable of being performed on an edge device (e.g., connected to the sensors unit in an industrial setup and one end and to a remote server(s) such as for computing server(s) or cloud computing server(s) on other end), that may be a compact computing device that includes a small form factor and resource constraints in terms of computing power. A network of the edge computing devices may also be used to implement the apparatus. Such a network of edge computing devices is referred to as a fog network.

In an embodiment, the apparatus is a cloud computing system including a cloud computing-based platform configured to provide a cloud service for analyzing condition data of the bearing and/or the technical system. As used herein, "cloud computing" refers to a processing environment including configurable computing physical and logical resources, for example, networks, servers, storage, applications, services, etc., and data distributed over the network, for example, the internet. The cloud computing system provides on-demand network access to a shared pool of the configurable computing physical and logical resources. The network is, for example, a wired network, a wireless network, a communication network, or a network formed from any combination of the networks.

Embodiments provide a system including one or more devices capable of providing condition data associated with operation of one or more technical systems in a plurality of facilities. The system also includes an apparatus, communicatively coupled to the one or more devices. The apparatus is configured for determining remaining life of at least one bearing in one or more technical systems.

Embodiments provide a computer-program product including machine-readable instructions stored therein, that when executed by a processor, cause the processor to perform a method as describe above.

BRIEF DESCRIPTION OF THE FIGURES

FIG. 6 depicts a method for determining remaining life of a bearing, according to an embodiment.

DETAILED DESCRIPTION

Figure 1:
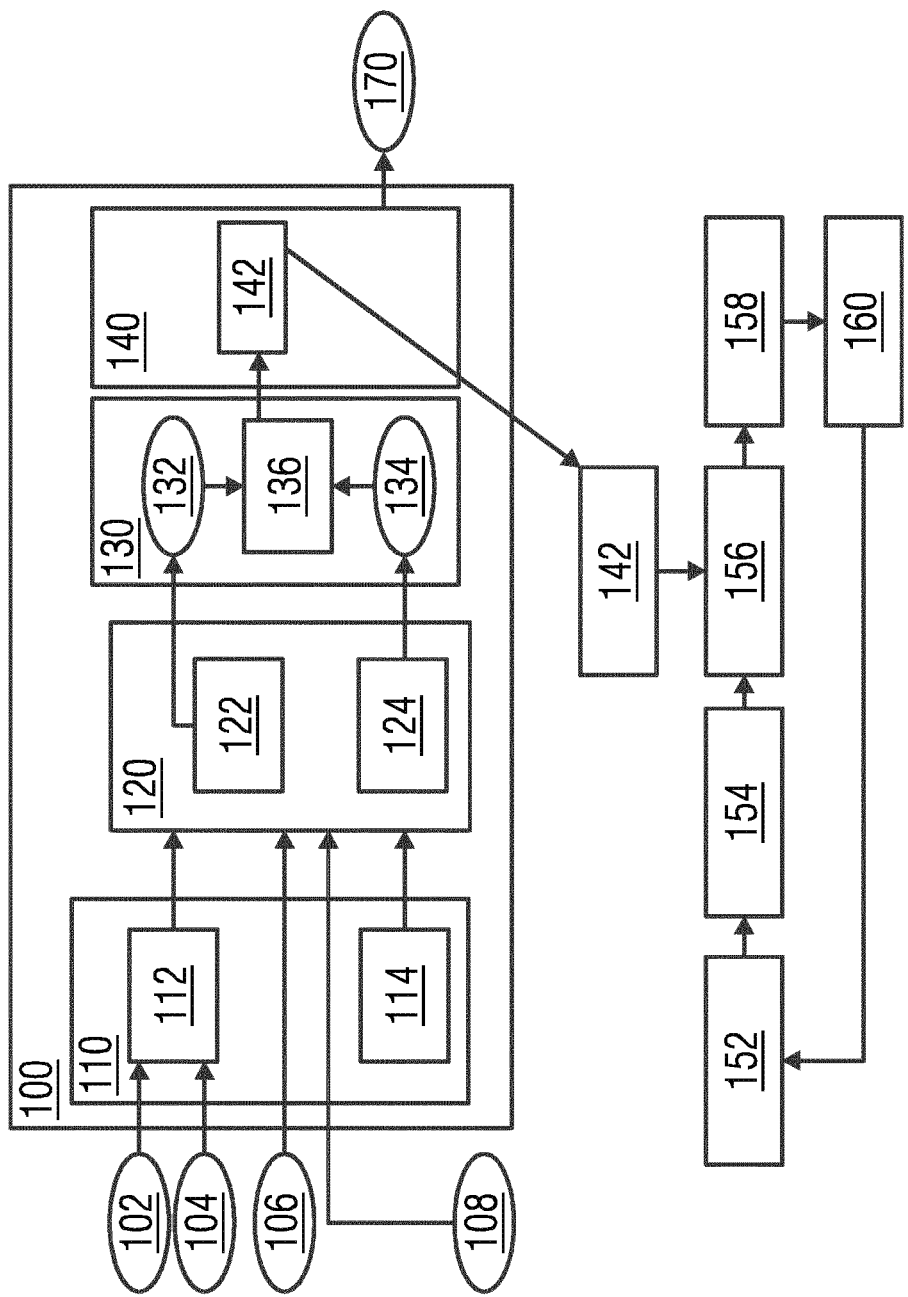
FIG. 1 depicts a block diagram of a bearing model for a bearing, according to an embodiment.

FIG. 1 depicts a block diagram of a bearing model 100 for a bearing in a technical system. The bearing model 100 is generated using condition data 102 associated with the bearing and the technical system. The condition data 102 includes bearing load, bearing speed, etc. The bearing model 100 is also generated using historical condition data 104 associated with the bearing and the technical system. Further, the bearing model 100 is generated using bearing specification 106 and technical specification 108. Accordingly, the condition data 102, the historical condition data 104, the bearing specification 106 and the technical specification 108 are indicated as inputs to the bearing model 100.

The bearing model 100 includes voltage model 110, current model 120, thermal model 130, defect model 140. The voltage model 110, current model 120, thermal model 130 and defect model 140 are implemented in one of a one-dimension model, mathematical model and a three-dimension model. The bearing model 100 integrates the different implementation models. An output of the bearing model 100 is used to perform the steps 152-160 to determine the remaining life of the bearing at step 170.

The voltage model 110 includes a breakdown voltage model 112 and a common mode voltage model 114. The voltage model 110 of the bearing is based on the condition data. In FIG. 1, the bearing load and bearing speed is mapped with respect to breakdown voltage of the bearing by the breakdown voltage model 112. Further, a common mode voltage of the bearing is modelled based on the bearing load and bearing speed by the common mode voltage model 114.

The current model 120 of the bearing based on the voltage model 110, the bearing specification 106 and the technical specification 108. For example, the bearing specification includes bearing dimensions, bearing size, bearing lubrication, lubrication thickness, bearing operating temperature, bearing interfaces, etc. The technical specification includes technical system type, technical system load, technical system speed, technical system orientation, etc. The current model 120 maps the breakdown voltage and the common mode voltage to discharge current.

The current model 120 includes equivalent circuit model 122 generated based on the bearing specification and the technical specification. Further, the common mode voltage as input to the equivalent circuit. The equivalent circuit outputs shaft-ground voltage in response to the common mode voltage. The current model 120 is generated based on the shaft ground voltage. Further, the current model 120 includes a discharge current model 124. The discharge current model 124 includes values of the discharge current in time series with respect to the shaft ground voltage and the common mode voltage.

The thermal model 130 includes a heat model 132 based on the current model 120. The heat model 132 is a distribution of spark heat of at least one spark in time series. The at least one spark is determined based on radius and peaks of the discharge current from the current model 120.

The thermal model 130 includes a radius model 134 of the at least one spark. The radius model 134 determines radius of the at least one spark based on the discharge current. The thermal model 130 also includes a location model 136 determines spark location by mapping the spark heat and the spark diameter to surface points on the bearing.

The defect model 140 includes a defect profile model 142. The defect profile model 142 is configured to map the spark heat and the spark diameter to defect profiles. The defect profiles output from the bearing model 100 and used to determine the remaining life of the bearing at step 170.

Further, the defect profiles are validated by performing steps 152-160. At step 152, the bearing specification and the technical specification are used to generated predetermined defect profiles. The bearing specification and the technical specification includes Computer Aided Drawings and multi-physics models of the bearing and the technical system.

At step 154, the predetermined defect profiles are mapped to defect locations on the bearing. Further, at step 156 the condition data 102 from the bearing is provided to update the predetermined defect profiles with real-time operating conditions associated with the bearing. At step 158, the defect profile 142 generated from the bearing model 100 is compared with the predetermined defect profiles to validate the spark location. At step 160, an erosion pattern is determined based on the bearing model 100 and the predetermined defect profiles. The erosion pattern is updated in the bearing specification and the technical specification to improve detection of defects in a fleet of the bearing.

Figure 2:
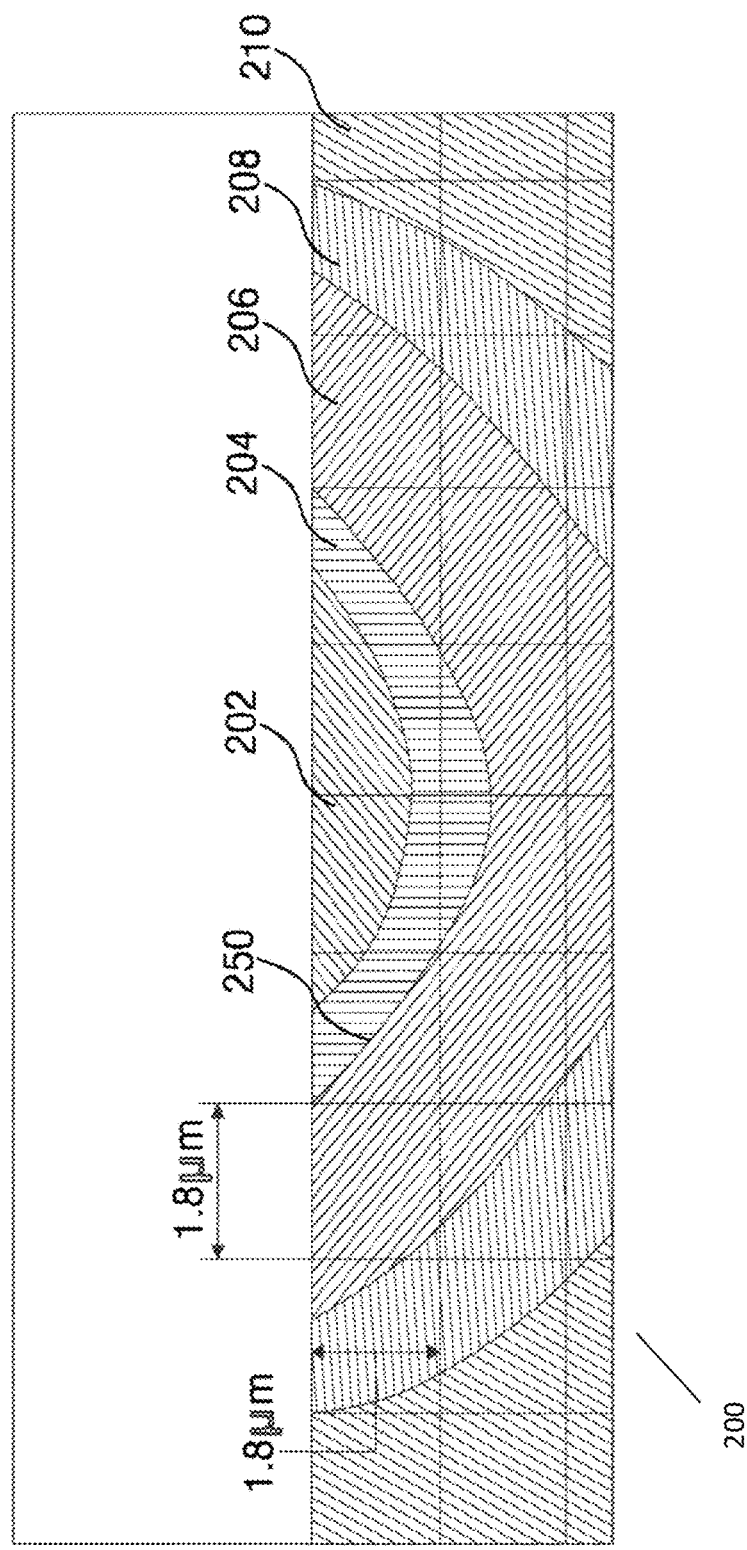
FIG. 2 depicts determination of an erosion pattern from the bearing model, according to an embodiment.

FIG. 2 depicts determination of an erosion pattern 250 from the bearing model 100, according an embodiment. The thermal model 130 of the bearing model 100 is used to determine the erosion pattern 250. The thermal model 130 the spark heat and spark diameter distribution depicted by the graph 200.

As shown in graph 200, peak of the spark heat is depicted as peak range 202 in the range of 4800° C.-5000° C. The distribution of the spark heat reduces to high range 204 in the range of 4200° C.-4800° C. The erosion pattern 250 is depicted in between the high range 204 and medium-high range 206. The medium-high range 206 is in the range of 3700° C.-4200° C. In addition, the spark heat is also distributed in lower-medium range 208 and lower range 210. In an embodiment, the spark heat distribution is averaged to determine the spark diameter and alse the erosion pattern.

Figure 3:
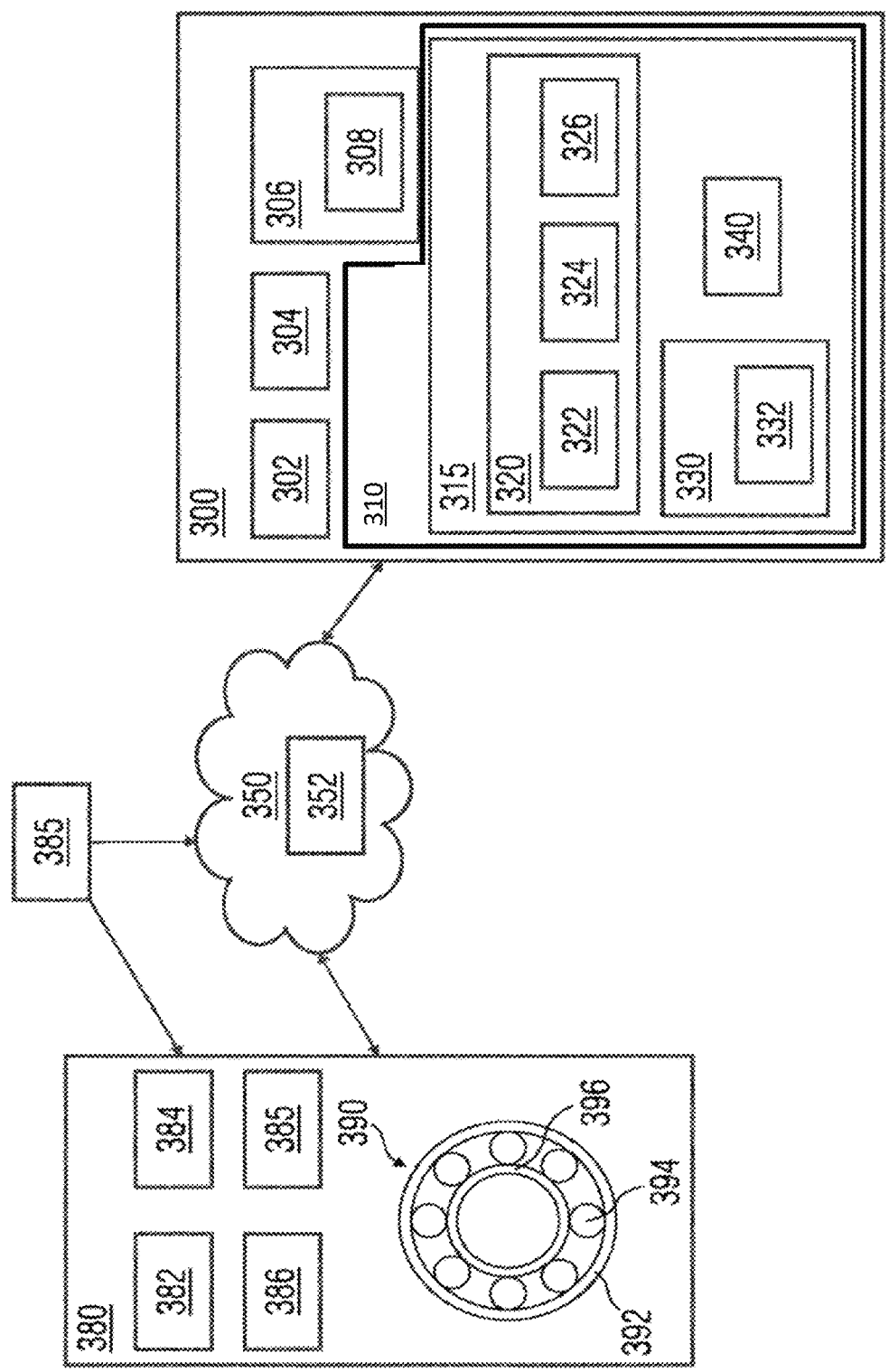
FIG. 3 depicts a block diagram of an apparatus for determining remaining life of a bearing, according to an embodiment.

FIG. 3 depicts a block diagram of an apparatus 300 for determining remaining life of a bearing 390 in a technical system 380, according an embodiment. The bearing 390 in the technical system 380 includes an outer ring 392, a ball 394 and an inner ring 396. The ball 394 runs on a bearing raceway (not shown in FIG. 3).

The technical system 380 is associated multiple sensors 385 that measure operation parameters of the technical system 380. The term "operation parameter" refers to one or more characteristics of the technical system. For example, if a motor in an electric vehicle is the technical system, the operation parameters include vibration frequency, vibration amplitude, engine temperature, etc. In an embodiment, the sensors 385 may be provided external to the technical system 380. The sensors 385 may be configured to communicate to the network interface 350 directly.

Further, the technical system 380 includes a trans-receiver 382, a controller 384 and a capable of connecting to a network interface 350. The technical system 380 may also include a Graphical User Interface (GUI) 386 to enable user or service personnel to operate the technical system 380.

In an embodiment, the controller 384 receives sensor data from the sensors 385 and transmits the sensor data to the apparatus 300 via the network interface 350. In another embodiment, the controller 384 performs the functions of the apparatus 300. The controller 384 may include a processor and a memory including modules in the apparatus 300, specifically bearing module 315.

The apparatus 300 includes a communication unit 302, at least one processor 304, a display 306, a Graphical User Interface (GUI) 308 and a memory 310 communicatively coupled to each other. The communication unit 302 includes a transmitter, a receiver and Gigabit Ethernet port. The memory 310 may include 2 Giga byte Random Access Memory (RAM) Package on Package (PoP) stacked and Flash Storage. The memory 310 is provided with modules stored in the form of computer readable instructions, for example, the bearing module 315. The processor 304 is configured to execute the defined computer program instructions in the modules. Further, the processor 302 is configured to execute the instructions in the memory 310 simultaneously. The display 306 includes a High-Definition Multimedia Interface (HDMI) display 306 and a cooling fan (not shown in the figure).

According to an embodiment, the apparatus 300 is configured on a cloud computing platform implemented as a service for analyzing data. Additionally, control personnel may access the apparatus 300 via the GUI 308. The GUI 308 is, for example, an online web interface, a web based downloadable application interface, etc.

The memory includes the bearing module 315 that includes a model generator module 320, a defect module 330 and a life module 340. The model generator module 320 is configured to generate a bearing model for the bearing 390. The model generator module 320 includes a voltage module 322, a current module 324 and a thermal module 326.

The voltage module 322 generates voltage model for the bearing 390. The voltage module 322 is configured to convert an alternating voltage input to the technical system 380 to a Pulse Width Modulated (PWM) output. For example, the technical system 390 is a three phase Alternating Current (AC) induction motor that are driven by Variable Frequency Drives (VFD). The alternating voltage input to the AC induction motor is converted to PWM output.

Further, the voltage module 322 is configured to determine whether the PWM output is within a predetermined voltage threshold. In the technical system 380 such as the AC induction motor, sum of three phases of PWM output must ideally be zero. Accordingly, it is determined whether the PWM output is within zero or in a tolerance range of zero.

Furthermore, the voltage module 322 is configured to the breakdown voltage and the common mode voltage based on deviation from the predetermined voltage threshold. In case of the AC induction motor, if the sum of the three phases of PWM output does not add to zero. The deviation from zero is used to determine the common mode voltage.

The current module 324 generates a current model of the bearing 390. The current module 324 is configured to map the breakdown voltage and the common mode voltage to discharge current. For example, the bearing specification includes bearing dimensions, bearing size, bearing lubrication, lubrication thickness, bearing operating temperature, bearing interfaces, etc. The technical specification includes technical system type, technical system load, technical system speed, technical system orientation, etc.

The current module 324 is configured to generate an equivalent circuit with bearing specification and technical specification of the bearing 390 and the technical system 380. For example, the equivalent circuit of the AC induction motor is represented in relation to the capacitances, inductances and resistances of winding, frame, etc of the AC induction motor.

The current model is generated by applying the common mode voltage as input to the equivalent circuit. The equivalent circuit outputs shaft-ground voltage in response to the common mode voltage. The current model is generated based on the shaft ground voltage. As used herein, the current model includes values of the discharge current in time series with respect to the shaft ground voltage and the common mode voltage.

In addition, the current module 324 is configured to map lubricant thickness of the bearing 390 as a function of load and speed the technical system 380. For example, the lubricant thickness is determined by analysing various lubricant thickness in terms of the load and speed. The lubricant thickness is measured by:

$$H_0 = \frac{2.69 * G^{0.49} * U_0^{0.68}}{W_0^{0.067}} * (1 - 0.61 * e^{-0.73\chi})$$

With:

$$G = \alpha_p * E$$

$$U_0 = \frac{\eta_0 * u}{E * R_x}$$

$$W_0 = \frac{P}{E * R_x^2}$$

$$H_0 = \frac{h_0}{R}$$

Where:
$\alpha_p$ is pressure coefficient of viscosity of lubricant in the bearing 390
E Reduced elasticity modulus of the lubricant in the bearing 390
P Load of from contact with the bearing 390 and components in the technical system 390
$R_x$ Radius of curvature in motion plane of the ball 394 in the bearing 390

$h_0$ Central lubricant thickness of the lubricant in the bearing 390
R Radius of curvature of the ball 394 in the bearing 390
u Speed of the bearing 390
$\eta_0$ Dynamic oil viscosity of the lubricant in the bearing 390

The thermal module 326 is configured to generate the thermal model of the bearing 390 based on the current model. The thermal module 326 is configured to determine spark heat based on the current model for at least one spark. The at least one spark is identified based on peak and radius of the discharge current determined in the current model.

Further, the thermal module 326 is configured to determine a spark diameter based on the current model. As used herein, the thermal model is a representation of the spark heat and the spark diameter. The thermal model maps the spark heat and the spark diameter to the discharge current. In an embodiment, the thermal model includes distribution of the spark heat and the spark diameter in time series.

In an embodiment, the thermal module 326 is configured to generate the distribution of the spark heat by determining Gaussian heat flux distribution of the at least one spark. For example, the spark heat distribution is determined by:

$$\frac{4.45 R_w U_b I}{\pi R^2} \exp\left\{-4.5\left(\frac{r}{R}\right)^2\right\}$$

Where:
$R_w$ is energy partion ratio
$U_b$ is the breakdown voltage of the bearing 390
I is the current in the bearing 390
R is the radius of the discharge current from the bearing 390
r is radial distance from center of the at least one spark
The spark radius is determined by $$\frac{E_o R}{K \pi^{0.5}} \tan^{-1}\left[\frac{4\alpha t}{R^2}\right]^{0.5}$$

Where:
R is the radius of the discharge current of the bearing 390
$\alpha$ is the thermal diffusivity
t is the on time of the at least one spark
K is the thermal conductivity
$E_o$ is the energy density The thermal module 326 is further configured to determine location of the at least one spark based on the distribution of the spark heat and the spark radius.

The defect module 330 is configured to generate a defect model to determine a defect in the bearing 390 based on the bearing model. As used herein, the term "defect profile" refers to anomalous data represented as a function of operation environment, operation profile and/or load profile associated with the bearing and/or technical system. The defect in the bearing 390 may include erosion of bearing raceway due to the discharge current. The defect module 330 includes defect profile module 332. The defect profile module 332 is configured to generate the defect profiles based on the distribution of the spark heat and the spark radius.

In an embodiment, the network interface 350 is a cloud interface with a cloud computing platform 352. The cloud computing platform 352 include a profile generator module. The profile generator is configured to generate predetermined defect profiles based on the bearing specification and the technical specification. The predetermined defect profiles are used by the defect profile module 332 to validate the defect profiles generated based on the spark heat and the spark radius. The validated defect profiles are used to determine the defect in the bearing 390.

In an embodiment, the defect profile module 332 is configured to generate an erosion pattern based on the spark heat and the spark radius. The erosion pattern is indicative of the defect such as defect type, defect location, defect severity, etc.

The life module 340 is configured to determine the remaining life of the bearing 390 based on the defect. The life module 340 is configured to predict a defect propagation based on location of the defect and type of the defect. The life module 340 is configured to estimate an expended life of the bearing 390 based on the bearing model. The remaining life is estimated based on the expended life.

The expended life, the remaining life and a usage profile of the bearing are rendered on the display 306 via the GUI 308. The GUI 308 is configured to interactively render a degradation view of the bearing 390 and/or the technical system 380 based on the bearing model. The degradation view depicts a real-time degradation and a predicted degradation of the bearing 390 or the technical system 380.

Figure 4:
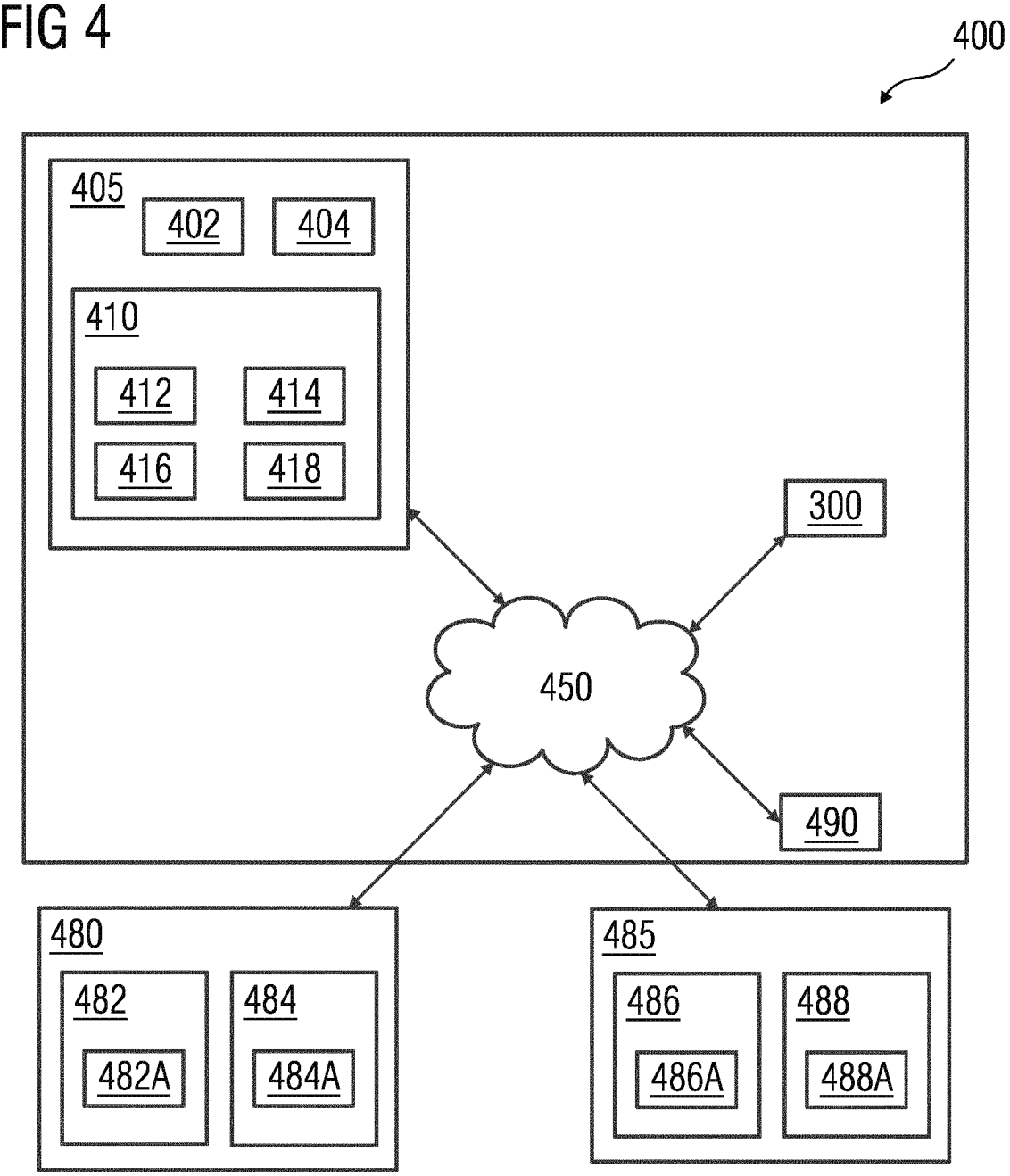
FIG. 4 depicts a system to manage one or more technical systems with one or more bearings, according to an embodiment.

FIG. 4 depicts a system 400 to manage one or more technical systems 482, 484, 486, 488 with one or more bearings 482A, 484A, 486A and 488A according an embodiment. The technical systems 482, 484, 486, 488 are located in separate facilities 480 and 485. Example facility may be a complex industrial set-up such as a power plant, wind farm, power grid, manufacturing facility, process plants and so on.

The system 400 includes a server 405, a network interface 450 communicatively coupled to the server 405. The system 400 also includes the apparatus 300 communicatively coupled to the technical systems 482, 484, 486, 488 and the server 405 via the network interface 450. The operation of the apparatus 300 is in accordance with the above description.

The server 405 includes a communication unit 402, one or more processing units 404 and a memory 410. The memory 410 includes a bearing database 412 and a system database 414. The memory 410 is configured to store computer program instructions defined by modules, for example, a profile generator module 416 and a design module 418. In an embodiment, server 405 may also be implemented on a cloud computing environment, where computing resources are delivered as a service over the network 450.

As used herein, "cloud computing environment" refers to a processing environment including configurable computing physical and logical resources, for example, networks, servers, storage, applications, services, etc., and data distributed over the network 450, for example, the internet. The cloud computing environment provides on-demand network access to a shared pool of the configurable computing physical and logical resources. The network 450 is, for example, a wired network, a wireless network, a communication network, or a network formed from any combination of the networks.

The bearing database 412 is a repository of bearing specification of the bearing 482A and a fleet of the bearing (for example bearings 484A, 486A and 488A including 482A). The system database 414 is a repository of technical specification of the technical system 482 and a fleet of the technical system (for example, technical systems 484, 486, 488).

The profile generator module 416 is configured to generate defect profiles based on the bearing specification and the technical specification. The defect profiles are updated based on the defect detected in the bearing 482A in real-time. The design module 418 determines whether the defect is recurrent in the fleet of bearings. If the defect is recurrent, design for the fleet of bearings is optimized to mitigate the defect.

The system 400 is also includes third party maintenance center 490 that may provide service and maintenance to the technical systems 482, 484, 486, 488. The maintenance center 490 is determined such that the availability and reliability of the technical systems 482, 484, 486, 488 is ensured.

Figure 5:
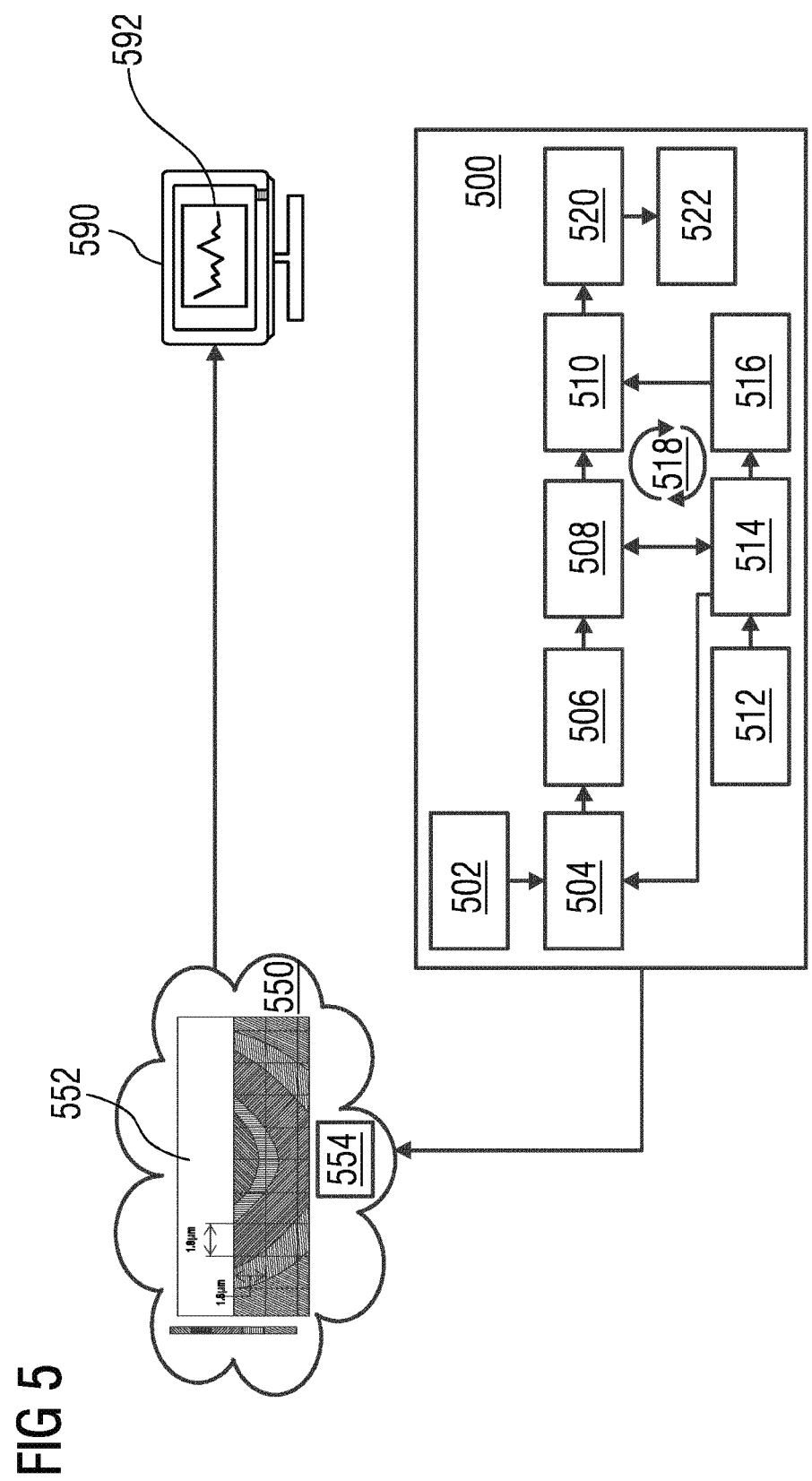
FIG. 5 depicts a system for determining remaining life of a bearing in a technical system, according to an embodiment.

FIG. 5 depicts a system for determining remaining life of a bearing in a technical system, according to an embodiment. The system includes an apparatus 500 associated with the bearing. The system also includes a cloud computing platform 550 including defect module 552 and an analyzer module 554. The system also includes a user device 590 accessible to a user via a GUI 592.

The apparatus 500 performs the steps 502-522 to determine the remaining useful life of the bearing. At step 502, a thermal model of the bearing is generated based on a bearing specification and a technical specification. At step 504 an erosion pattern is determined based on the thermal model. At step 506, the erosion pattern is validated based on predetermined defect profiles generated by the defect module 552. Further, at step 506, remaining life of the erosion pattern is determined based on the predetermined defect profiles.

The defect module 552 is configured to generate the defect profiles based on historical condition data of the bearing. The defect module 552 received analysed historical condition data of the bearing and a fleet of the bearings from the analyser module 554. The analyser module 554 includes a learning algorithm using one of supervised learning technique and unsupervised learning technique to automatically determine defects in the historical condition data. The defects in the historical condition data are used to generate the defect profiles by the defect module 552.

At step 508, operation parameters such as vibration frequency and vibration amplitude are analysed to evaluate impact on the erosion pattern. At step 510, characteristics of the erosion pattern are determined based on the vibration frequency and the vibration amplitude.

Further, at step 512 a current model is generated based on condition data associated with the operation of the bearing and the technical system. At step 514, vibration data from the condition data is used to generate a real-time defect pattern. At step 516, the real-time defect pattern is mapped to the erosion pattern. At step 518, the erosion pattern is tuned to converge with the real-time defect pattern. The tuning of the real-time defect pattern is performed to modify the remaining life of the erosion pattern in accordance with the condition data.

At step 520, the real-time defect pattern rendered on the GUI 592 to indicate a defect in a bearing raceway. At step 522, the remaining life and expended life are rendered in real-time on the GUI 592.

FIG. 6 depicts a method for determining remaining life of a bearing, according to an embodiment. The method begins at step 602 by receiving condition data associated with the operation of the bearing and a technical system housing the bearing. The condition data of the bearing/technical system is received from different sources (e.g., sensors, scanners, user devices, etc.). The sensors measure operating parameters associated with the technical system. The sensors may include vibration sensors, current and voltage sensors, etc.

For example, measurement of shaft voltage in a motor is mapped to an operation parameter of the bearing. The term "operation parameter" refers to one or more characteristics of the bearing. Accordingly, the condition data is a measure of the operating parameters associated with the operation of the bearing. For example, the condition data includes values of vibration, temperature, current, magnetic flux, velocity, power of the motor including the bearing.

At step 604, a voltage model of the bearing is generated based on the condition data. The condition data includes bearing load and bearing speed. In an embodiment, the bearing load and bearing speed is mapped with respect to breakdown voltage of the bearing and a common mode voltage of the bearing. In an embodiment, the bearing load and bearing speed are mapped in a graphical programming environment. The advantage of mapping the bearing load and bearing speed provides modelling, simulation and analysis of multidomain dynamical systems.

At step 606, a current model of the bearing is generated based on the voltage model, the bearing specification and the technical specification. The current model maps the breakdown voltage and the common mode voltage to discharge current. For example, the bearing specification includes bearing dimensions, bearing size, bearing lubrication, lubrication thickness, bearing operating temperature, bearing interfaces, etc. The technical specification includes technical system type, technical system load, technical system speed, technical system orientation, etc.

At step 608, a thermal model is generated based on the current model. As used herein, the thermal model is a representation of the spark heat and the spark diameter. The thermal model maps the spark heat and the spark diameter to the discharge current. In an embodiment, the thermal model includes distribution of the spark heat and the spark diameter in time series.

At step 610, a defect model is generated based on the thermal model. The defect model includes defects that are detected in the condition data. At step 610, the condition data is compared with defect profiles to predict the defects. As used herein, the term "defect profile" refers to anomalous data represented as a function of operation environment, operation profile and/or load profile associated with the bearing and/or technical system.

The defect profiles are generated based on the bearing specification and the technical specification. The defect in the bearing may also be predicted based on the comparison between the condition data and with predetermined defect profiles.

At step 612, location of the defects is determined based on the defect profile and the condition data. For example, at step 612 location of at least one spark in the bearing is determined. The location of spark may be determined in the bearing raceway.

At step 614, remaining life of the bearing is predicted based on the predicted defect and the location of the defect. Further, a defect propagation based on location of the defect and type of the defect. Further, the remaining life of the bearing based on the predicted defect propagation. As used herein, the remaining life refers to life of the bearing with and without the detected defect. The remaining life includes remaining useful life (RUL), down-time, maintenance time, etc.

Embodiments may include a computer program product including program modules accessible from computer-usable or computer-readable medium storing program code for use by or in connection with one or more computers, processors, or instruction execution system. For the purpose of this description, a computer-usable or computer-readable medium may be any apparatus that may contain, store, communicate, propagate, or transport the program for use by or in connection with the instruction execution system, apparatus, or device. The medium may be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processors and program code for implementing each aspect of the technology may be centralized or distributed (or a combination thereof) as known to those skilled in the art.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method of determining a remaining life of a bearing, the method comprising:
   receiving, from one or more sensors, real time condition data for the bearing comprising a measure of operating parameters associated with the operation of the bearing including at least a bearing load and a bearing speed;
   generating a bearing model of the bearing comprising at least a voltage model, a current model, and a thermal model, wherein the bearing model is generated based on the real time condition data associated with operation of the bearing, historical condition data of the bearing, a bearing specification, and a technical specification of a technical system including the bearing, wherein the voltage model determines a breakdown voltage and a common mode voltage with respect to the bearing load and the bearing speed, wherein the current model determines a discharge current from the breakdown voltage and the common mode voltage, wherein the thermal model determines a spark heat and a spark diameter from at least the discharge current and wherein the thermal model includes a distribution of the spark heat and the spark diameter in a time series;
   determining an erosion pattern for the bearing based on at least the thermal model;
   predicting the remaining life of the bearing based on the erosion pattern.

2. The method of claim 1, wherein generating the voltage model of the bearing based on the condition data including bearing load and bearing speed comprises:
   converting an alternating voltage input to the technical system to a pulse width modulated output;
   determining whether the pulse width modulated output is within a predetermined voltage threshold; and
   determining the breakdown voltage and the common mode voltage based on deviation from the predetermined voltage threshold.

3. The method of claim 1, wherein generating the current model of the bearing based on the voltage model and the bearing specification comprises:
   generating an equivalent circuit with the bearing specification and the technical specification; and
   generating the current model by applying the common mode voltage on the equivalent circuit, wherein the current model includes values of the discharge current in time series.

4. The method of claim 1, wherein generating the thermal model comprises:
   determining radius and peaks of the discharge current in the current model;
   determining the spark heat for a bearing surface of the bearing based on the radius and peaks of discharge current; and
   generating the thermal model by mapping the spark heat and the spark diameter with the discharge current and surface points on the bearing surface.

5. The method of claim 1, wherein predicting the remaining life comprises:
   comparing the erosion pattern with one or more defect profiles, wherein the one or more defect profiles are generated based on the bearing specification and the technical specification; and
   predicting a defect in the bearing based on the comparison with the one or more defect profiles.

6. The method of claim 5, further comprising:
   predicting the erosion pattern on a bearing surface based on a defect profile of the one or more defect profiles.

7. The method of claim 1, wherein predicting the remaining life of the bearing, comprises:
   predicting a defect propagation based on a location of a defect and a type of the defect; and
   predicting the remaining life of the bearing based on the predicted defect propagation.

8. The method of claim 7, further comprising:
   estimating an expended life of the bearing based on the bearing model; and
   rendering the expended life, the remaining life and a usage profile of the bearing.

9. A system for determining a remaining life of at least one bearing in one or more technical systems in a plurality of facilities, the system comprising:
   one or more sensors capable of providing real time condition data associated with operation of the one or more technical systems; and
   an apparatus communicatively coupled to the one or more sensors, the apparatus comprising one or more processing units and a memory unit communicative coupled to the one or more processing units, wherein the memory unit comprises a bearing module stored in a form of machine-readable instructions executable by the one or more processing units, wherein the bearing module is configured to:
   generate a voltage model of the at least one bearing based at least in part on the condition data comprising a bearing load and bearing speed, wherein the voltage model determines a breakdown voltage and a common mode voltage of the at least one bearing based on the bearing load and the bearing speed;

generate a current model of the at least one bearing based on the voltage model, a bearing specification, and a technical specification, wherein the current model determines a discharge voltage from the breakdown voltage and the common mode voltage;

generate a thermal model of the at least one bearing based on at least the real time condition data, wherein the thermal model determines a spark heat and a spark diameter from at least the discharge current and wherein the thermal model includes a distribution of the spark heat and the spark diameter in a time series;

determine an erosion pattern for the bearing based on at least the thermal model; and predict the remaining life of the at least one bearing based on the erosion pattern.

10. A non-transitory computer-program product having machine-readable instructions stored therein, which when executed by one or more processing units, cause the one or more processing units to:

acquire condition data for a bearing;

generate a voltage model of the bearing based an operation of the bearing including bearing load and bearing speed, wherein the voltage model determines a breakdown voltage and a common mode voltage from the bearing load and the bearing speed;

generate a current model of the bearing based on the voltage model, a bearing specification for the bearing, and a technical specification of a technical system including the bearing, wherein the current model determines a discharge voltage from the breakdown voltage and the common mode voltage;

determine a spark heat and a spark diameter based on the current model;

determine an erosion pattern for the at least one bearing based at least in part on the spark heat; and predict the remaining life of the at least one bearing based on the erosion pattern.

11. The computer-program product of claim 10, wherein the machine-readable instructions for generating the voltage model comprise machine-readable instructions to:

convert an alternating voltage input to the technical system to a pulse width modulated output;

determine whether the pulse width modulated output is within a predetermined voltage threshold; and determine the breakdown voltage and the common mode voltage based on deviation from the predetermined voltage threshold.

12. The computer-program product of claim 10, wherein the machine-readable instructions for generating the current model of the bearing based on the voltage model and the bearing specification comprise machine-readable instructions to:

generate an equivalent circuit with the bearing specification and the technical specification; and generate the current model by applying the common mode voltage on the equivalent circuit, wherein the current model includes values of the discharge current in time series.

13. The computer-program product of claim 10, wherein the machine-readable instructions further comprise machine-readable instructions to:

determine radius and peaks of the discharge current in the current model;

determine the spark heat for a bearing surface of the bearing based on the radius and peaks of the discharge current; and generate a thermal model by mapping the spark heat and the spark diameter with the discharge current and surface points on the bearing surface.

14. The computer-program product of claim 10, wherein the machine-readable instructions further comprise:

predicting a defect in the bearing based on the bearing model comprising machine readable instructions to:

compare the condition data with a defect profile, wherein the defect profile is generated based on the bearing specification and the technical specification; and predict the defect in the bearing based on the comparison with the defect profile.

15. The computer-program product of claim 14, wherein the machine-readable instructions further comprise machine-readable instructions to predict the erosion pattern on a bearing surface based on the defect profile.

16. The computer-program product of claim 10, wherein the machine-readable instructions for predicting the remaining life of the bearing comprise machine-readable instructions to:

predict a defect propagation based on location of a defect and type of the defect; and predict the remaining life of the bearing based on the predicted defect propagation.

17. The computer-program product of claim 16, wherein the machine-readable instructions further comprise machine-readable instructions to estimate an expended life of the bearing based on the bearing model; and render the expended life, the remaining life and a usage profile of the bearing.

* * * * *